(12) United States Patent
Kohler et al.

(10) Patent No.: US 10,905,963 B2
(45) Date of Patent: Feb. 2, 2021

(54) SYSTEM AND METHOD FOR CREATING AND STREAMING AUGMENTED GAME SESSIONS

(71) Applicant: Activision Publishing, Inc., Santa Monica, CA (US)

(72) Inventors: Johan Kohler, Woodland Hills, CA (US); Bharathwaj Nandakumar, Los Angeles, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/158,108

(22) Filed: Oct. 11, 2018

(65) Prior Publication Data
US 2019/0308107 A1    Oct. 10, 2019

Related U.S. Application Data

(62) Division of application No. 13/731,661, filed on Dec. 31, 2012, now Pat. No. 10,137,376.

(51) Int. Cl.
*A63F 13/00* (2014.01)
*A63F 13/86* (2014.01)
(Continued)

(52) U.S. Cl.
CPC ............ *A63F 13/86* (2014.09); *A63F 13/00* (2013.01); *A63F 13/497* (2014.09);
(Continued)

(58) Field of Classification Search
CPC .... A63F 13/00; A63F 13/497; A63F 13/5252; A63F 13/86; A63F 2300/634;
(Continued)

(56) References Cited

U.S. PATENT DOCUMENTS 5,031,089 A    7/1991    Liu
5,442,569 A    8/1995    Osano
(Continued)

FOREIGN PATENT DOCUMENTS

AU           768367       3/2004
AU         2005215048    10/2011
(Continued)

OTHER PUBLICATIONS

Derek Stanley, "What bitrate should I use when encoding my video? How do I optimize my video for the web?", Feb. 12, 2012, ers3.com, <https://web.archive.org/web/20120212171320/https://www.ezs3.com/public/What_bitrate_should_I_use_when_encoding_my_video_How_do_I_optimize_my_video_for_the_web.cfm> (Year: 2012).*

(Continued)

*Primary Examiner* — Justin L Myhr
(74) *Attorney, Agent, or Firm* — Novel IP

(57) ABSTRACT

An approach is provided for streaming of media streams (e.g., from a game console). In one implementation, a media stream that includes a secondary view of the game world may be generated at the game console. The secondary view may be of a lower-quality version of a primary view of the game world. The generation of the media stream may include: prefetching, to a cache of the game console, portions of the primary view and/or instructions for encoding the portions; and encoding, based on the prefetching, the portions to produce the secondary view. In another implementation, game play information may be executed to reproduce previous game play of a previous game session during a reproduction of the previous game session. Augmentation content may be added to the reproduced game session during the reproduction of the previous game session, creating an augmented game session having one or more views for streaming.

18 Claims, 7 Drawing Sheets

(51) Int. Cl.
*H04N 21/4402* (2011.01)
*H04N 21/63* (2011.01)
*A63F 13/5252* (2014.01)
*A63F 13/497* (2014.01)

(52) U.S. Cl.
CPC ..... *A63F 13/5252* (2014.09); *H04N 21/4402* (2013.01); *H04N 21/632* (2013.01); *A63F 2300/577* (2013.01)

(58) Field of Classification Search
CPC .. A63F 2300/6661; A63F 13/12; A63F 13/10; A63F 2300/572; A63F 2300/577; A63F 2300/305; A63F 2300/6009; A63F 2300/6018; A63F 2300/206; A63F 2300/308; A63F 2300/407; A63F 2300/636; A63F 2300/65; H04N 21/4402; H04N 21/632; G06T 15/20; H04L 67/38
See application file for complete search history.

(56) References Cited

U.S. PATENT DOCUMENTS

| | | |
|---|---|---|
| 5,530,796 A | 6/1996 | Wang |
| 5,535,276 A | 7/1996 | Ganesan |
| 5,539,883 A | 7/1996 | Allon |
| 5,561,736 A | 10/1996 | Moore |
| 5,563,946 A | 10/1996 | Cooper |
| 5,630,129 A | 5/1997 | Wheat |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,736,990 A | 4/1998 | Barrus |
| 5,737,416 A | 4/1998 | Cooper |
| 5,745,678 A | 4/1998 | Herzberg |
| 5,762,552 A | 6/1998 | Vuong |
| 5,768,511 A | 6/1998 | Galvin |
| 5,774,668 A | 6/1998 | Choquier |
| 5,796,393 A | 8/1998 | MacNaughton |
| 5,825,877 A | 10/1998 | Dan |
| 5,835,692 A | 11/1998 | Cragun |
| 5,860,137 A | 1/1999 | Raz |
| 5,875,296 A | 2/1999 | Shi |
| 5,878,233 A | 3/1999 | Schloss |
| 5,883,628 A | 3/1999 | Mullaly |
| 5,884,024 A | 3/1999 | Lim |
| 5,900,879 A | 5/1999 | Berry |
| 5,903,266 A | 5/1999 | Berstis |
| 5,903,271 A | 5/1999 | Bardon |
| 5,908,469 A | 6/1999 | Botz |
| 5,911,045 A | 6/1999 | Leyba |
| 5,920,325 A | 7/1999 | Morgan |
| 5,923,324 A | 7/1999 | Berry |
| 5,938,722 A | 8/1999 | Johnson |
| 5,944,824 A | 8/1999 | He |
| 5,963,915 A | 10/1999 | Kirsch |
| 5,969,724 A | 10/1999 | Berry |
| 5,977,979 A | 11/1999 | Clough |
| 5,990,888 A | 11/1999 | Blades |
| 6,008,848 A | 12/1999 | Tiwari |
| 6,009,455 A | 12/1999 | Doyle |
| 6,014,145 A | 1/2000 | Bardon |
| 6,021,268 A | 2/2000 | Johnson |
| 6,025,839 A | 2/2000 | Schell |
| 6,049,819 A | 4/2000 | Buckle |
| 6,058,266 A | 5/2000 | Megiddo |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,088,727 A | 7/2000 | Hosokawa |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,134,588 A | 10/2000 | Guenthner |
| 6,141,699 A | 10/2000 | Luzzi |
| 6,144,381 A | 11/2000 | Lection |
| 6,148,328 A | 11/2000 | Cuomo |
| 6,179,713 B1 | 1/2001 | James |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,141 B1 | 12/2001 | Varma |
| 6,336,134 B1 | 1/2002 | Varma |
| 6,337,700 B1 | 1/2002 | Kinoe |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,370,560 B1 | 4/2002 | Robertazzi |
| 6,393,467 B1 | 5/2002 | Potvin |
| 6,411,312 B1 | 6/2002 | Sheppard |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,473,597 B1 | 10/2002 | Johnson |
| 6,499,053 B1 | 12/2002 | Marquette |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,601,084 B1 | 7/2003 | Bhaskaran |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,699,127 B1 | 3/2004 | Lobb |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,801,930 B1 | 10/2004 | Dionne |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,089,266 B2 | 8/2006 | Stolte |
| 7,124,071 B2 | 10/2006 | Rich |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |

(56) References Cited

U.S. PATENT DOCUMENTS

| | | |
|---|---|---|
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,353,295 B1 | 4/2008 | Crow |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,548,948 B2 * | 6/2009 | Klemets ............ H04N 5/76  709/203 |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |

(56) References Cited

U.S. PATENT DOCUMENTS

| | | |
|---|---|---|
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,550,920 B1 | 10/2013 | Allen |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,005,030 B2 | 4/2015 | Laakkonen |
| 9,005,036 B2 | 4/2015 | Laakkonen |
| 9,083,654 B2 | 7/2015 | Dawson |
| 9,152,914 B2 | 10/2015 | Haggar |
| 9,199,165 B2 | 12/2015 | Zahn |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,403,090 B2 | 8/2016 | Harris |
| 9,474,973 B2 | 10/2016 | Perry |
| 9,525,746 B2 | 12/2016 | Bates |
| 9,583,109 B2 | 2/2017 | Kurata |
| 9,621,622 B2 | 4/2017 | Ueda |
| 9,630,097 B2 | 4/2017 | Paradise |
| 9,641,592 B2 | 5/2017 | Thompson |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2002/0007317 A1 | 1/2002 | Callaghan |
| 2002/0010776 A1 | 1/2002 | Lerner |
| 2002/0023159 A1 | 2/2002 | Vange |
| 2002/0056006 A1 | 5/2002 | Vange |
| 2002/0065870 A1 | 5/2002 | Baehr-Jones |
| 2002/0078192 A1 | 6/2002 | Kopsell |
| 2002/0107918 A1 | 8/2002 | Shaffer |
| 2002/0124137 A1 | 9/2002 | Ulrich |
| 2003/0008712 A1 | 1/2003 | Poulin |
| 2003/0037131 A1 | 2/2003 | Verma |
| 2003/0055892 A1 | 3/2003 | Huitema |
| 2003/0056002 A1 | 3/2003 | Trethewey |
| 2003/0084172 A1 | 5/2003 | Dejong |
| 2003/0084302 A1 | 5/2003 | De |
| 2003/0110399 A1 | 6/2003 | Rail |
| 2003/0135621 A1 | 7/2003 | Romagnoli |
| 2003/0149781 A1 | 8/2003 | Yared |
| 2003/0163733 A1 | 8/2003 | Barriga-Caceres |
| 2003/0177187 A1 | 9/2003 | Levine |
| 2004/0014514 A1 | 1/2004 | Yacenda |
| 2004/0073773 A1* | 4/2004 | Demjanenko ....... G06F 9/30036 712/7 |
| 2004/0103079 A1 | 5/2004 | Tokusho |
| 2004/0210627 A1 | 10/2004 | Kroening |
| 2004/0228291 A1 | 11/2004 | Huslak |
| 2004/0244006 A1 | 12/2004 | Kaufman |
| 2005/0015571 A1 | 1/2005 | Kaufman |
| 2005/0246711 A1 | 11/2005 | Berstis |
| 2007/0060359 A1 | 3/2007 | Smith |
| 2007/0294089 A1 | 12/2007 | Garbow |
| 2008/0046956 A1 | 2/2008 | Kulas |
| 2008/0139301 A1 | 6/2008 | Holthe |
| 2008/0270605 A1 | 10/2008 | Berstis |
| 2008/0301405 A1 | 12/2008 | Kaufman |
| 2009/0113448 A1 | 4/2009 | Smith |
| 2009/0131177 A1 | 5/2009 | Pearce |
| 2009/0258708 A1* | 10/2009 | Figueroa ............ G07F 17/3295 463/43 |
| 2009/0298585 A1* | 12/2009 | Cannon ................... A63F 13/26 463/31 |
| 2010/0153653 A1* | 6/2010 | El-Mahdy ........... G06F 12/0862 711/137 |
| 2010/0167816 A1* | 7/2010 | Perlman .................. A63F 13/12 463/30 |
| 2011/0151971 A1 | 6/2011 | Altshuler |
| 2012/0100910 A1* | 4/2012 | Eichorn ........... H04N 21/43615 463/31 |
| 2012/0289346 A1 | 11/2012 | Van Luchene |
| 2014/0031121 A1 | 1/2014 | Kern |
| 2014/0221084 A1 | 8/2014 | Morrison, III |
| 2014/0235336 A1 | 8/2014 | Morimoto |
| 2014/0344725 A1 | 11/2014 | Bates |
| 2014/0370979 A1 | 12/2014 | Zahn |
| 2015/0141140 A1 | 5/2015 | Lampe |
| 2015/0224395 A1 | 8/2015 | Trombetta |
| 2015/0224399 A1 | 8/2015 | Melo |
| 2015/0375102 A1 | 12/2015 | George |
| 2016/0171835 A1 | 6/2016 | Washington |
| 2016/0180647 A1 | 6/2016 | Webb |
| 2016/0191671 A1 | 6/2016 | Dawson |
| 2016/0214012 A1 | 7/2016 | Nishikawa |
| 2017/0014718 A1 | 1/2017 | Ceraldi |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0940960 A1 | 9/1999 |
| EP | 0998091 A2 | 5/2000 |
| EP | 1020804 A2 | 7/2000 |
| EP | 0627728 B1 | 9/2000 |
| EP | 1089516 A2 | 4/2001 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H1198134 A | 4/1999 |

(56) References Cited

FOREIGN PATENT DOCUMENTS

| | | | |
|---|---|---|---|
| JP | H11191097 A | | 4/1999 |
| JP | 11191097 | | 7/1999 |
| JP | 3033956 | B2 | 4/2000 |
| JP | 3124916 | B2 | 1/2001 |
| JP | 3177221 | B2 | 6/2001 |
| JP | 2001204973 A | | 7/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| KR | 20020038229 A | | 5/2002 |
| KR | 20030039019 A | | 5/2003 |
| MY | 117864 A | | 8/2004 |
| SG | 55396 | | 12/1998 |
| TW | 424213 | | 3/2001 |
| TW | 527825 | | 4/2003 |
| WO | 9642041 A2 | | 12/1996 |
| WO | 9900960 A1 | | 1/1999 |
| WO | 0203645 A2 | | 1/2002 |
| WO | 2002073457 | | 9/2002 |
| WO | 20020087156 | | 10/2002 |
| WO | 03049459 A1 | | 6/2003 |
| WO | 03058518 A2 | | 7/2003 |
| WO | 2004086212 | | 10/2004 |
| WO | 2005079538 | | 9/2005 |
| WO | 2007101785 | | 9/2007 |
| WO | 2008073599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 A1 | | 8/2010 |

OTHER PUBLICATIONS

Planet Unreal, "Unreal Tournament Game Guide", game released Nov. 1999 with earliest article cmment on Sep. 6, 2007, IGN Entertainment, <http://planetunreal.gamespy.com/View.php?view=UTGameInfo.Detail&id=28&game=6><h ttp://planetunreal.gamespy.com/View.php?view=UTGameInfo.Detail&id=1&game=6>.

EverQuest Wiki, "EverQuest Classes", Aug. 19, 2011, <http://everquest.wikia.com/wiki/Classes?oldid=3773>.

Ma et al., "A Scalable Parallel Cell-Projection Volume Rendering Algorithm for Three-Dimensional Unstructured Data", IEEE 1997, pp. 1-10.

Hassen et al., "A Task-and Data-Parallel Programming Language Based on Shared Objects," ACM Transactions on Programming Languages and Systems, vol. 20, No. 6, Nov. 1998, pp. 1131-1170.

Kormann et al., "Risks of the Passport Single Signon Protocol"< 9th Intl. WWW Conf., May 15, 2000.

Syverson, "Limitations on design principles for public key protocols", Proc. of 1996 IEEE Symposium on Security and Privacy, pp. 62-72, May 6, 1996.

Abadi et al., "Prudent Engineering Practice for Cryptogrphic Protocols", Proc. of 1994 IEEE Computer Society Symposium on Research in Security and Privacy, pp. 122-136, May 16, 1994.

IBM developer Works, OptimalGrid—autonomic computing on the Grid, James H. Kaufman; Tobin J. Lehman; Glenn Deen; and John Thomas, Jun. 2003.

IBM, Transcoding: Extending e-business to new environments, Britton et al., Sep. 22, 2000.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.

"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.

Lee et al., "A Self-Adjusting Data Distribution Mechanism for Multidimensional Load Balancing in Multiprocessor-Based Database Systems," Information Systems vol. 19, No. 7, pp. 549-567, 1994.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

Andert, "A Simulation of Dynamic Task Allocation in a Distributed Computer System," Proceedings of the 1987 Winter Simulation Conference, 1987, pp. 1-9.

* cited by examiner

SYSTEM AND METHOD FOR CREATING AND STREAMING AUGMENTED GAME SESSIONS

CROSS REFERENCE

The present application is a divisional application of U.S. patent application Ser. No. 13/731,661, entitled "System and Method for Creating and Streaming Augmented Game Sessions" and filed on Dec. 31, 2012, which is herein incorporated by reference in its entirety.

FIELD OF THE INVENTION

The invention relates generally to the streaming of media streams, for example, from a game console. The media streams may, for instance, be of live game sessions, augmented game sessions created via augmentation during reproduction of previous game sessions, and/or other game sessions.

BACKGROUND OF THE INVENTION

Online gaming has become one of the world's largest forms of entertainment. In recent years, live streaming of competitive gaming has become one of the hottest trends. For example, gamers and their fans may live stream competitive gaming events to learn new game strategies utilized by other gamers and/or for entertainment purposes. As such, a number of service providers have developed services to facilitate streaming of gaming events (e.g., e-sport events) from desktop computers to streaming service sites for presentation of the streamed gaming events to viewers around the world. However, gamers are currently unable to live stream their game sessions directly from their game consoles to such streaming service sites without the use of an intermediary device due to, for example, lower memory and processing capabilities of game consoles (e.g., compared to traditional servers and/or desktop computers). The inability to live stream from a game console may diminish the overall game play experience for console users.

Additionally, commentators often provide an additional form of entertainment in conjunction with streaming of the gaming events. Great commentary, for instance, may attract a larger number of viewers to gaming events due to the "personalities" of the commentators. However, while a commentator may add his/her audio or visual commentary to a recorded game-session video (e.g., by combining a video of the commentary and a captured video of the game session), the commentator is limited to seeing only the views of the game session that have been captured by the video of the game session. Accordingly, alternative approaches to typical streaming of game sessions and/or commentation may be advantageous.

SUMMARY OF THE INVENTION

One aspect of the invention relates to a system that is configured to facilitate streaming of media streams from a game console, in accordance with one or more implementations. Another aspect of the invention relates a system that is configured to facilitate streaming of augmented game sessions created via augmentation during reproduction of previous game sessions.

The various components of such system(s) may be configured for electronic communication among one another. Such communication may be accomplished via one or more networks, one or more direct connections, one or more wireless connections, one or more wired connections, and/or other electronic communication media. One or more of the components of the system may be implemented in a server (not shown). The server may be in communication with client computing platforms via a client/server architecture to enable users access to the server via client computing platforms.

A processor may be configured to provide information processing capabilities within the system. For example, the processor may configured to execute computer program modules that may include one or more of a game module, a communication module, an encoding module, a vector processing module, a streaming module, an augmentation module, a game play storage module, a number-type conversion module, and/or other modules. In some implementations, a given client computing platform (e.g., a game console) may include the processor and/or the computer program modules to facilitate operations and/or functions described herein. In other implementations, a server may include the processor and/or the computer program modules to facilitate operations and/or functions described herein.

The game module may be configured to execute an instance of a game world, for instance, at a game console. The game module may be configured to generate, based on the game world, a primary view of the game world for local viewing. By way of example, the primary view may be a view rendered to a player of the instance of the game world on a display that is locally connected to his/her game console. The primary view may be generated based on interactions among various players of the game world, interactions of the players with simulated elements of the game world, simulated events of the game world, augmented elements, and/or other features. The primary view may be rendered based on one or more media formats (e.g., image format, video format, etc.) to depict the various interactions, simulated events, augmented elements, and/or other features. The communication module may, for instance, be configured to obtain action requests specifying in-game actions. The game module may be configured to implement requested actions in the instance of the game world. As an example, the requested actions may cause one or more simulated events in the instance of the game world, resulting in the generation of a primary view depicting the simulated events.

The encoding module may be configured to generate, at the game console, a media stream including a secondary view of the game world. The secondary view may be a lower-quality version of the primary view. By way of example, compared with the primary view, the secondary view may be associated with one or more of a lower resolution, frame rate, bit rate, and/or other quality factors. It should be noted that, although the secondary view may be a lower-quality version of the primary view, the quality of the primary and secondary views may not necessarily be distinguishable to viewers.

The encoding module may be configured such that the generation of a media stream includes: prefetching, to the cache of the game console, one or more of portions of the primary view or instructions for encoding the portions of the primary view; and encoding, based on the prefetching, the portions of the primary view to produce the secondary view. For example, due to lower memory and processing capabilities of game consoles (e.g., compared with conventional desktops), traditional encoding approaches may not allow a game console to effectively encode and stream a current game session during the game session. As such, by prefetching data to the cache of the game console (e.g., L1 cache, L2 cache, etc.), and by encoding primary views of the game session using the prefetched data, a game console may avoid large latencies associated with directly loading the data from main memory to encode the primary views. As a result, the game console may be configured to more effectively encode and stream a current game session in real-time.

In certain implementations, the encoding module may comprise code that indicates the prefetching to the cache and the encoding of the portions of the primary view to produce the secondary view. By way of example, the code may be written such that it indicates prefetching of the primary view portions and/or the encoding instructions to L1 cache, L2 cache, etc., of the gaming console in a way that reduces delays associated with cache misses. In some implementations, the one or more processors may include a first processor of a first processor type and a second processor of a second processor type different from the first processor type, and the code of the encoding module may indicate execution of a first part of the code using the first processor and execution of a second part of the code using the second processor. Although certain parts of the code may generally be more suitable for processing by a processing unit of a first processing unit type, the code may indicate processing of those certain parts of the code by a processing unit of second processing unit type, for instance, to balance the utilization of the processing units so that the processing unit of the first processing type is not significantly overutilized (e.g., to avoid waiting delays) and the processing unit of the second processing type is not significantly underutilized (e.g., to avoid waste of available processing power).

In various implementations, the vector processing module may include the encoding module such that the vector processing module may be configured to initiate the prefetching to the cache and the encoding of the portions of the primary view to produce the secondary view (e.g., to perform vector operations to optimize routines associated with the encoding process). In some implementations, the vector processing module may be configured to load, in parallel, one or more of a first portion of the portions or the instructions for encoding the first portion from the cache to a first register associated with the vector processing module, and one or more of a second portion of the portions or the instructions for encoding the second portion from the cache to a second register associated with the vector processing module, such that the encoding of the portions of the primary view to produce the secondary view may be based on the loading from the cache to the first and second registers. In this way, by loading the first and second registers in parallel, the vector processing module may overcome slower processing speeds associated with game consoles by reducing loading delays (e.g., waiting for the loading of a register to be completed).

In certain implementations, portions of the primary view may be represented by a first set of numbers of a first number type. The number-type conversion module may be configured to convert the first set of numbers into a second set of numbers of a second number type, and the encoding of the portions of the primary view to produce the secondary view may be based on the conversion. In some implementations, the encoding module may be configured to initiate lookup table function calls to retrieve results of certain mathematical operations as a way to mitigate computational load associated with conversion of the first set of numbers to the second set of numbers.

The streaming module may be configured to effectuate streaming of the media stream (e.g., from the game console to a web server). For example, as a result of the optimizations described herein (e.g., prefetching of data to the cache of the game console, encoding of the prefetched data at the game console, explicit resource utilization balancing, etc.), the game console may be configured to effectively encode and stream a current game session while facilitating operations necessary to effectuate game play for the game session.

In some implementations, the game module may be configured to obtain game play information associated with a previous game session of a game. The game play information may define previous game play of the previous game session. The previous game play may, for instance, include actions initiated by players of the previous game session, interactions among user characters associated with the players, attributes of the user characters, environments of the previous game session (e.g., in which the actions were initiated, the user characters interacted with, etc.), and/or other game play.

The game module may be configured to execute the game play information to reproduce the previous game play during a reproduction of the previous game session. In some implementations, the game module may be configured such that the reproduction of the previous game session may include generating one or more views of the previous game session for presentation to the user.

In various implementations, the game module may be configured such that one or more properties of the reproduction of the previous game session are controllable by the user during the reproduction of the previous game session. The one or more properties may include viewpoint, magnification field, inclusion of screen objects (e.g., compass, maps, alerts, etc.), and/or other properties. In this way, the control of the properties may enable the user to better analyze the previous game play, for instance, to provide better commentary for the previous game play since the user may be able to adjust the viewpoints along with the focus of the viewpoints to better suit his/her needs.

The augmentation module may be configured to effectuate adding of augmentation content to the reproduced game session in response to user input received from an augmenting user during the reproduction of the previous game session. The addition of the augmentation content to the reproduced game session may create an augmented game session. For example, the user may be a commentator and may activate the reproduction of the previous game session to provide commentary of the previous game play in an augmented game session. The user may, for instance, be able to input requests to jump to any viewpoint (e.g., first-person, third-person, etc.) of any of the players of the previous game session to provide commentary based on what is seen through those viewpoints (e.g., the viewpoints of opposing players).

In certain implementations, the game module may be configured to generate a new view of the previous game session during the reproduction of the previous game session. The augmentation module may be configured such that the augmentation content includes the new view. For example, an augmenting user may input a selection for a new viewpoint unavailable to the players in the previous game session, causing generation of a new view based on the new viewpoint selected by the user. Thus, the user may provide commentary for the new view in creating the augmented game session (e.g., such that a media stream of the augmented game session may include the new view and the commentary for the new view). In this way, the user is able to provide viewers of the augmented game session with additional insight into the previous game session along with intriguing new views that would otherwise have been missed by simply watching typical recorded media streams having commentary.

In some implementations, the augmentation module may be configured to facilitate selection by an augmenting user of one or more views of the augmented game session that are streamed from among a plurality of views of the augmented game session. The plurality of views of the augmented game session may, for instance, include the one or more views of the previous game session generated during the reproduction, new views generated during the reproduction, and/or other views associated with the augmented game session.

The streaming module may be configured to effectuate streaming of the one or more views of the augmented game session. In some implementation, the streaming may include real-time streaming of the one or more views of the augmented game session to one or more viewers as the augmentation content is added to the reproduced game session. By way of example, although the previous game play initially occurred during the previous game session, the game play information associated with the previous game session may be obtained (e.g., downloaded from a web service, loaded from storage at a game console, etc.) and utilized to reproduce the previous game play during a reproduction/augmentation session (e.g., the reproduced and augmented game sessions). Thus, the streaming of the one or more views of the augmented game session may include live, real-time streaming with respect to the augmented game session.

In various implementations, the augmented game session may include a plurality of players. The plurality of players may include a first player and an augmenting user. The game may include a plurality of player types and a plurality of in-game actions. The plurality of player types may include first and second player types. The first player may be of the first player type, and the user may be of the second player type. By way of example, the first player may be a player in the previous game session and the augmented game session, while the user may only be a player in the augmented game session. In one scenario, with respect to the augmented game session, the first player may be a simulated player whose actions may be predefined (e.g., the actions may be recorded from the previous game session in the form of the game play information), while the second player may be a live player whose actions are initiated during the augmented game session to facilitate augmenting content to the reproduced game session.

In certain implementations, the plurality of in-game actions may include first actions of the first player type and second actions of the second player type. The first actions of the first player type may be actions that are available to players of the first player type (e.g., the first player), while actions of the second type may be actions that are available to players of the second player type (e.g., the augmenting user).

In various implementations, the previous game play may include the first actions, and the first actions may have been implemented on behalf of the first player in the previous game session. For example, the first actions may have been implemented during the previous game session responsive to action requests for the first actions by the first player, and recorded during the previous game session in the form of the game play information. The first actions may be reinitiated during the reproduction of the previous game session using the game play information. On the other hand, the second actions may be initiated for the first time during the reproduction of the previous game session. Thus, in some implementations, the game module may be configured to implement the second actions for the user during the reproduction of the previous game session responsive to action requests for the second actions by the user.

The game play storage module may be configured to generate the game play information responsive to implementation of the first actions during the previous game session. For example, the game play information may be generated during the previous game session based on actions implemented in the previous game session. The game play information may be stored at a game console, at a web service, etc., to enable future reproduction of the previous game session for augmentation purposes.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
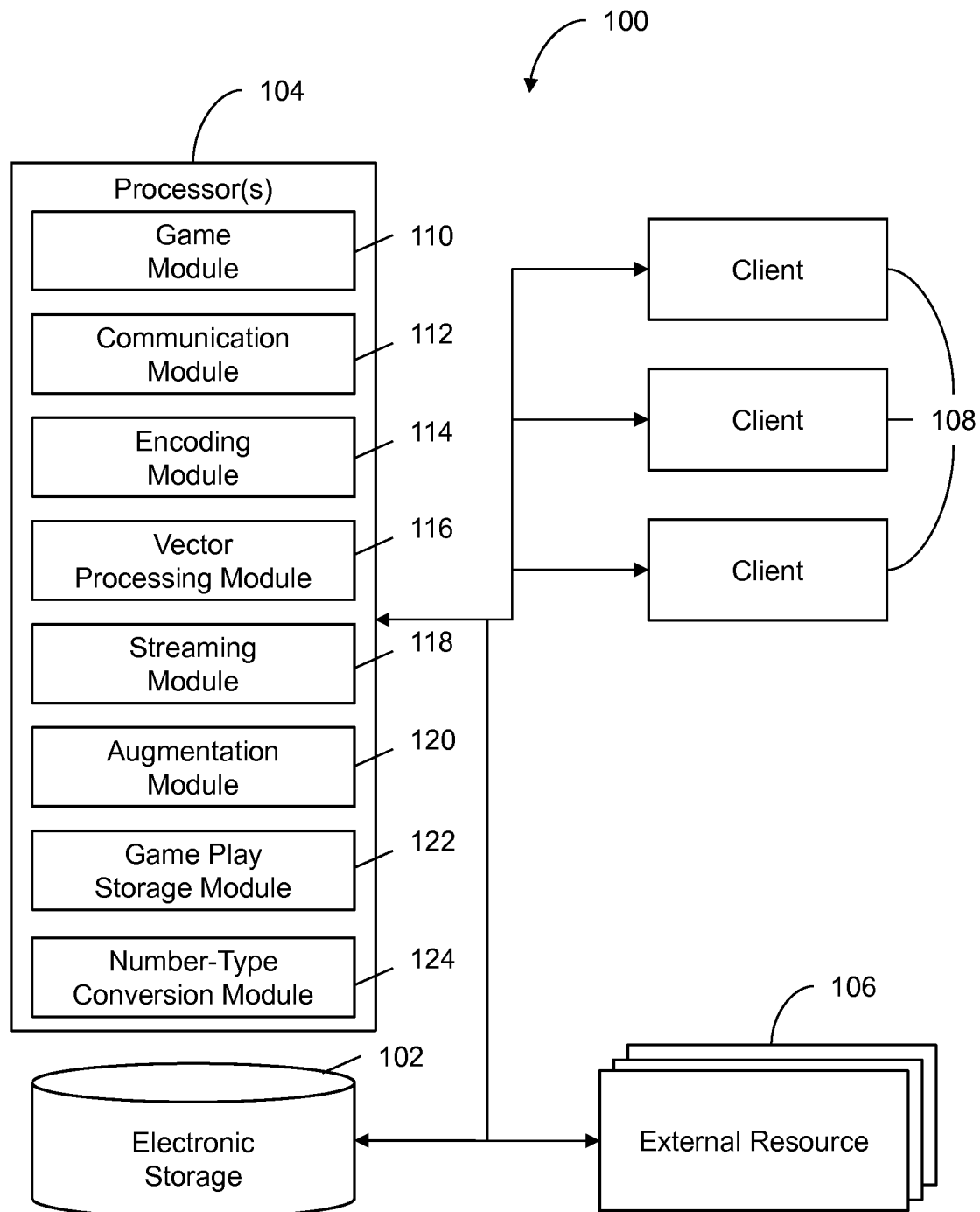
FIG. 1 illustrates a system configured to facilitate streaming of media streams, in accordance with one or more implementations.

FIG. 1 illustrates a system 100 configured to facilitate streaming of media streams, in accordance with one or more implementations. In some implementations, system 100 may comprise one or more of electronic storage 102, processor 104, external resources 106, client computing platforms 108, and/or other components. The various components of system 100 may be configured for electronic communication among one another. Such communication may be accomplished via one or more networks, one or more direct connections, one or more wireless connections, one or more wired connections, and/or other electronic communication media. One or more of the components of system 100 may be implemented in a server (not shown). The server may be in communication with client computing platforms 108 via a client/server architecture to enable users access to the server via client computing platforms 108.

Processor 104 may be configured to provide information processing capabilities within system 100. For example, processor 104 may configured to execute computer program modules that may include one or more of a game module 110, a communication module 112, an encoding module 114, a vector processing module 116, a streaming module 118, an augmentation module 120, a game play storage module 122, a number-type conversion module 124, and/or other modules. In some implementations, a given client computing platform 108 (e.g., a game console) may include one or more processors and/or computer program modules that are the same as or similar to processor 104 and/or the depicted computer program modules to facilitate operations and/or functions described herein. In other implementations, a server may include one or more processors and/or computer program modules that are the same as or similar to processor 104 and/or the depicted computer program modules to facilitate operations and/or functions described herein.

In some implementations, electronic storage 102 may comprise non-transitory electronic storage media that electronically stores information. Electronic storage 102 may include one or both of system storage that is provided integrally (e.g., substantially non-removable) with system 100 and/or removable storage that is removably connectable to system 100 via, for example, a port (e.g., a USB port, a firewire port, etc.) or a drive (e.g., a disk drive, etc.). Electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 102 may include virtual storage resources, such as storage resources provided via a cloud and/or a virtual private network. Electronic storage 102 may store software algorithms, information determined by processor 104, information received via client computing platforms 108, and/or other information that enables system 100 to function properly. Electronic storage 102 may be a separate component within system 100, or electronic storage 102 may be provided integrally with one or more other components of system 12 (e.g., processor 104, client computing platforms 108, servers of system 100, etc.). For example, in certain implementations, the non-transitory electronic storage media of electronic storage 102 may include a cache (e.g., L1 cache, L2 cache, etc.) of processor 104.

In some implementations, electronic storage 102, processor 104, external resources 106, client computing platforms 108, and/or other components (e.g., servers of system 100) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which electronic storage 102, processor 104, external resources 106, client computing platforms 108, and/or other components may be operatively linked via some other communication media.

In some implementations, the external resources 106 may include sources of information, hosts and/or providers of virtual spaces outside of system 100, external entities participating with system 100, and/or other resources. In some implementations, some or all of the functionality attributed herein to external resources 106 may be provided by resources included in system 100.

In some implementations, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include a plurality of processing units. These processing units may be physically located within the same device, or processor 104 may represent processing functionality of a plurality of devices operating in coordination. Processor 104 may be configured to execute modules 110, 112, 114, 116, 118, 120, 122, 124, and/or other modules. Processor 104 may be configured to execute modules 110, 112, 114, 116, 118, 120, 122, 124, and/or other modules by software; hardware; firmware; some combination of software, hardware, and/or firmware; and/or other mechanisms for configuring processing capabilities on processor 104.

It should be appreciated that although modules 110, 112, 114, 116, 118, 120, 122, and 124 are illustrated in FIG. 1 as being co-located within a single processing unit, in implementations in which processor 104 includes multiple processing units, one or more of modules 110, 112, 114, 116, 118, 120, 122, and/or 124 may be located remotely from the other modules. The description of the functionality provided by the different modules 110, 112, 114, 116, 118, 120, 122, and/or 124 described below is for illustrative purposes, and is not intended to be limiting, as any of modules 110, 112, 114, 116, 118, 120, 122, and/or 124 may provide more or less functionality than is described. For example, one or more of modules 110, 112, 114, 116, 118, 120, 122, and/or 124 may be eliminated, and some or all of its functionality may be provided by other ones of modules 110, 112, 114, 116, 118, 120, 122, and/or 124. As another example, processor 104 may be configured to execute one or more additional modules that may perform some or all of the functionality attributed below to one of modules 110, 112, 114, 116, 118, 120, 122, and/or 124.

Game module 110 may be configured to execute an instance of a game world, for instance, at a game console. Game module 110 may be configured to generate, based on the game world, a primary view of the game world for local viewing. By way of example, the primary view may be a view rendered to a player of the instance of the game world on a display locally connected to his/her game console. The primary view may be generated based on interactions among various players of the game world, interactions of the players with simulated elements of the game world, simulated events of the game world, augmented elements, and/or other features. The primary view may be rendered based on one or more media formats (e.g., image format, video format, etc.) to depict the various interactions, simulated events, augmented elements, and/or other features. Communication module 112 may, for instance, be configured to obtain action requests specifying in-game actions. Game module 110 may be configured to implement requested actions in the instance of the game world. The requested actions may cause one or more simulated events in the instance of the game world, resulting in the generation of a primary view depicting the simulated events.

Figure 2:
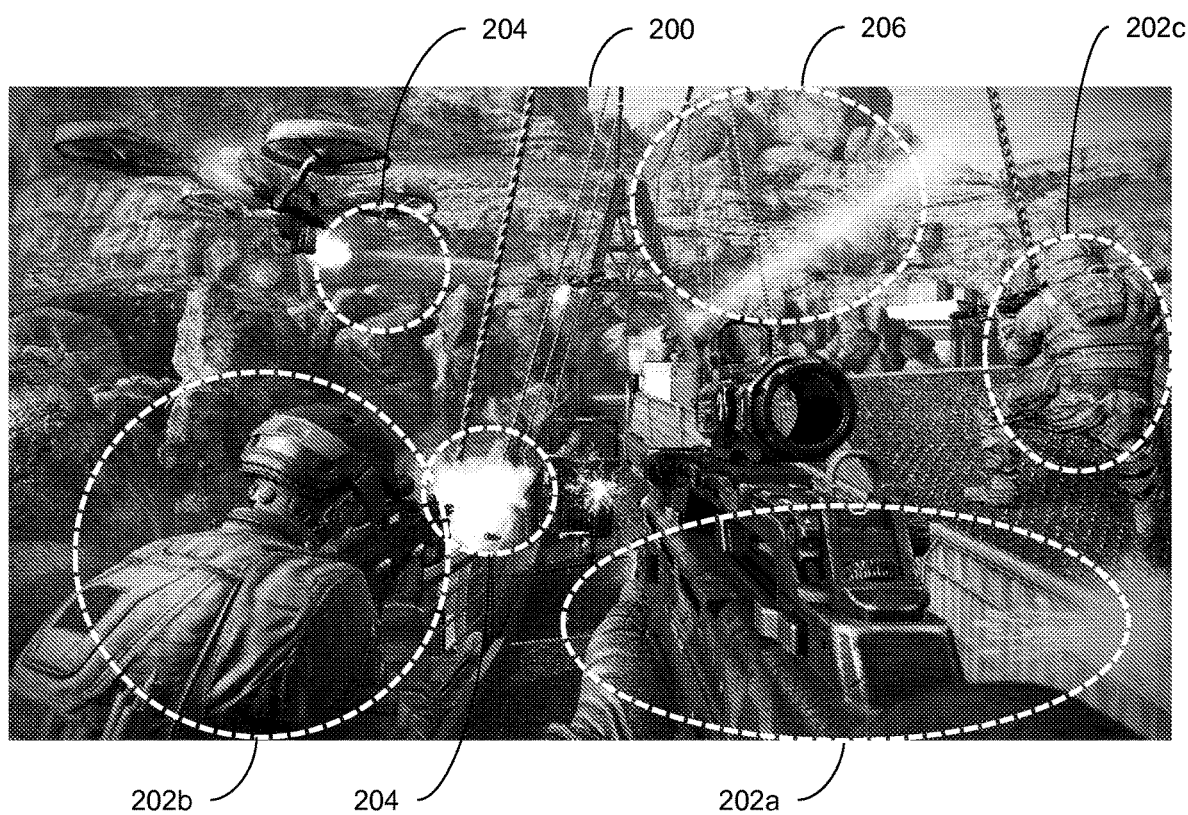
FIG. 2 illustrates a primary view of a game world, in accordance with one or more implementations.

For example, FIG. 2 illustrates a primary view 200 of a game world, in accordance with one or more implementations. As shown, primary view 200 depicts user characters representing players 202*a*, 202*b*, and 202*c*, simulated events 204 (e.g., gunshots being fired), and simulated elements 206 (e.g., cliffs, rocks, chains, buildings, etc.) associated with the environment of the game world, among other features. Players 202 may, for instance, interact with one another through their user characters of the game world to complete missions, to engage in combat, and/or perform other tasks. Players 202 may input action requests specifying in-game actions, such as moving around in the game world, changing viewpoints of their user characters, discharging bullets from their guns, etc. These in-game actions may, for instance, cause one or more simulated events (e.g., simulated events 204), such as gunshots being fired, explosions, death of a user character of a player 202, etc., to be rendered as part of primary view 200 along with the user characters, simulated elements 206, and/or other features.

The game world may, for instance, be a virtual space. An instance of the virtual space may be executed by computer modules to determine views of the virtual space. The views may then be communicated (e.g., via streaming, via object/position data, and/or other information) from server(s) and/or other sources to client computing platform(s) 108 for presentation to users. The view determined and transmitted to a given client computing platform 108 may correspond to a user character being controlled by a user via given client computing platform 108. The view determined and transmitted to a given client computing platform 108 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 108) that present the views of the virtual space to a user. The simulated space may have a topography, express ongoing real-time interaction by one or more users, and/or include one or more objects positioned within the topography that are capable of locomotion within the topography. In some instances, the topography may comprise a 2-dimensional topography. In other instances, the topography may comprise a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or one another. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 108. The users may interact with one another through communications exchanged within the virtual space. Such communications may include one or more of textual chat, instant messages, private messages, voice communications, and/or other communications. Communications may be received and entered by the users via their respective client computing platforms 108. Communications may be routed to and from the appropriate users through server(s).

Encoding module 114 may be configured to generate, at a game console, a media stream including a secondary view of the game world. The secondary view may be a lower-quality version of the primary view. By way of example, compared with the primary view, the secondary view may be associated with one or more of a lower resolution, frame rate, bit rate, and/or other quality factors. In one scenario, the secondary view may be associated with a higher frame rate than the primary view, but may be associated with a lower resolution and a lower bit rate. In another scenario, requirements for secondary views of the game world in the media stream may be between 15-30 frames per second, 320-640 pixels wide, and a bit rate of 1024 kilobits per second or less. On the other hand, requirements for primary views of the game world may be 15-30 frames per second, high-definition resolutions (e.g., 720p, 1080p, etc.), and 2048 kilobits per second or more. It should be noted that, although the secondary view may be a lower-quality version of the primary view, the quality of the primary and secondary views may not necessarily be distinguishable to viewers. For instance, with respect to FIG. 2, while the secondary view may be a lower-quality version of primary view 200, the lower quality may not necessarily be noticed by viewers of the media stream containing the secondary view.

Encoding module 114 may be configured such that the generation of a media stream includes: prefetching, to the cache of the game console, one or more of portions of the primary view or instructions for encoding the portions of the primary view; and encoding, based on the prefetching, the portions of the primary view to produce the secondary view. For example, due to lower memory and processing capabilities of game consoles (e.g., compared with conventional desktops), traditional encoding approaches may not allow a game console to effectively encode and stream a current game session during the game session. As such, by prefetching data to the cache of the game console (e.g., L1 cache, L2 cache, etc.), and by encoding primary views of the game session using the prefetched data, a game console may avoid large latencies associated with directly loading the data from main memory to encode the primary views. As a result, the game console may be configured to more effectively encode and stream a current game session in real-time. In this way, users may effectively stream their current game sessions from their respective game consoles as they play in the game sessions.

In certain implementations, encoding module 114 may comprise code that indicates the prefetching to the cache and the encoding of the portions of the primary view to produce the secondary view. By way of example, the code may be written such that it indicates prefetching of the primary view portions and/or the encoding instructions to L1 cache, L2 cache, etc., of the gaming console in a way that reduces delays associated with cache misses. In one scenario, prefetching may be performed based on cache miss predictions such that data predicted to incur a cache miss may be prefetched to cache before that data is needed. In another scenario, certain lines of code may be grouped together to optimize the prefetching/encoding process (e.g., based on calculated frequency of use associated with the primary view portions and/or the encoding instructions).

In some implementations, the one or more processors may include a first processor of a first processor type and a second processor of a second processor type different from the first processor type, and the code of encoding module 114 may indicate execution of a first part of the code using the first processor and execution of a second part of the code using the second processor. For example, a PS3™ (PlayStation® 3) game console may multiple processing units of various types, such as a VMX (Vector Multimedia Extension), a SPU (Synergistic Processor Unit), a PPU (Physics Processing Unit), and/or other processing units. Although certain parts of the code may generally be more suitable for processing by a processing unit of a first processing unit type (e.g., PPU), the code may indicate processing of those certain parts of the code by a processing unit of second processing unit type (e.g., SPU), for instance, to balance the utilization of the processing units so that the processing unit of the first processing type is not significantly overutilized (e.g., to avoid waiting delays) and the processing unit of the second processing type is not significantly underutilized (e.g., to avoid waste of available processing power).

In certain implementations, the code may indicate direct memory access (DMA) transfers of the primary view portions and/or the encoding instructions to local memory (e.g., the cache, designated area of memory for threads, etc.). For example, game consoles such as the PS3 may include a specialized processing unit (e.g., SPU) that requires that data be stored in local memory prior to processing of the data by the specialized processing unit.

In various implementations, vector processing module 116 may include encoding module 114 such that vector processing module 116 may be configured to initiate the prefetching to the cache and the encoding of the portions of the primary view to produce the secondary view. In one use case, vector processing module 116 may interact with the VMX of the gaming console to perform vector operations to optimize routines associated with the encoding process. In some implementations, vector processing module 116 may be configured to load, in parallel, one or more of a first portion of the portions or the instructions for encoding the first portion from the cache to a first register associated with vector processing module 116, and one or more of a second portion of the portions or the instructions for encoding the second portion from the cache to a second register associated with vector processing module 116, such that the encoding of the portions of the primary view to produce the secondary view may be based on the loading from the cache to the first and second registers. In this way, by loading the first and second registers in parallel, vector processing module 116 may overcome slower processing speeds associated with game consoles by reducing loading delays (e.g., waiting for the loading of a register to be completed).

In certain implementations, portions of the primary view may be represented by a first set of numbers of a first number type. Number-type conversion module 124 may be configured to convert the first set of numbers into a second set of numbers of a second number type, and the encoding of the portions of the primary view to produce the secondary view may be based on the conversion. For example, the VMX of the Xbox 360® game console is configured to perform direct multiplication of floats, but is not configured to perform direct multiplication of integers due to a lack of integer multiplies. Thus, in such a scenario, encoding module 114 may work with the number-type conversion module to convert integers into floats when multiplication is needed for encoding. In some implementations, encoding module 114 may be configured to initiate lookup table function calls to get around the lack of integer multiplies (and/or other missing mathematical operations). For example, encoding module 114 may be configured to pre-compute one or more multiplications and store the pre-computed results in an array. At runtime, encoding module 114 may be configured with the pre-computed results such that the array may be "looked up" via the lookup table function calls (e.g., of encoding module 114) to retrieve the pre-computed results for certain multiplications during the encoding process. In this way, computational load associated with conversion of the integers to floats for multiplications (and/or other mathematical operations) may be mitigated.

Streaming module 118 may be configured to effectuate streaming of the media stream (e.g., from the game console to a web server). For example, as a result of the optimizations described herein (e.g., prefetching of data to the cache of the game console, encoding of the prefetched data at the game console, explicit resource utilization balancing, etc.), the game console may be configured to effectively encode and stream a current game session while facilitating operations necessary to effectuate game play for the game session.

In some implementations, game module 110 may be configured to obtain game play information associated with a previous game session of a game. The game play information may define previous game play of the previous game session. The previous game play may, for instance, include actions initiated by players of the previous game session, interactions among user characters associated with the players, attributes of the user characters, environments of the previous game session (e.g., in which the actions were initiated, in which the user characters interacted, etc.), and/or other game play. For example, with respect to FIG. 2, assuming that primary view 200 represents a captured view of previous game play, the game play information may specify the movement of user characters of players 202, the triggering of the weapons of user characters of players 202, etc., along with the environment in which the actions took place, the sequence of the actions, and/or other information relating to the previous game play.

Game module 110 may be configured to execute the game play information to reproduce the previous game play during a reproduction of the previous game session. For example, the previous game play may be reproduced by reinitiating the actions defined in the game play information in their respective sequence order within the context of the environment in which the actions took place. In some implementations, game module 110 may be configured such that the reproduction of the previous game session may include generating one or more views of the previous game session for presentation to the user. By way of example, the views of the previous game session may include views that may have been presented to the players in the previous game session based on the previous game play associated with those players (e.g., the actions initiated by those players). In one use case, the one or more views of the previous game session may be generated and presented to a user facilitating augmentation of the reproduced game session to enable the user to see the previous game play as the user is providing augmentations to the reproduced game session.

In another scenario, the views of the previous game session that are presented to an augmenting user may be based on selection of the views by the user. The user may, for instance, be initially presented with a default viewpoint of one of the players, and the initial views of previous game session may be based on the default viewpoint. However, the user may select to switch to a viewpoint of another player to be presented with views based on the selected viewpoint.

In various implementations, game module 110 may be configured such that one or more properties of the reproduction of the previous game session are controllable by an augmenting user during the reproduction of the previous game session. The one or more properties may include viewpoint, magnification field, inclusion of screen objects, and/or other properties. As an example, an augmenting user may select the viewpoint from which the view presented to the user is based (e.g., viewpoints of players in the previous game session, new viewpoints unavailable to players in the previous game session, etc.) and the magnification field of the selected viewpoint such that the view presented to the user is a zoomed-in/zoomed-out view (e.g., a zoomed-in view generated based on a first-person viewpoint that is zoomed-in on a particular view area, a zoomed-out view generated based on a third-person viewpoint that is zoomed-out, etc.). As another example, the views of the previous game session may include screen objects (e.g., compass, maps, alerts, etc.) that were accessible to players in the previous game session. The user may opt to leave out such screen objects from the views presented to the user such that media streams created from those views will not render those screen objects. In this way, the control of the properties may enable the user to better analyze the previous game play, for instance, to provide better commentary for the previous game play since the user may be able to adjust the viewpoints along with the focus of the viewpoints to better suit his/her needs.

Augmentation module 120 may be configured to effectuate adding of augmentation content to the reproduced game session in response to user input received from an augmenting user during the reproduction of the previous game session. The addition of the augmentation content to the reproduced game session may create an augmented game session. In one use case, an augmenting user may be a commentator and may activate the reproduction of the previous game session to provide commentary of the previous game play in an augmented game session. The user may, for instance, be able to input requests to jump to any viewpoint (e.g., first-person, third-person, etc.) of any of the players of the previous game session to provide commentary based on what is seen through those viewpoints (e.g., the viewpoints of various players). In another scenario, the user may add screen objects (e.g., a map displaying the various locations of the players, a leaderboard showing the scores of the players, a clock/timer, etc.) to the reproduced game session such that a media stream of the augmented game session will include a rendering of the screen objects.

Figure 3A:
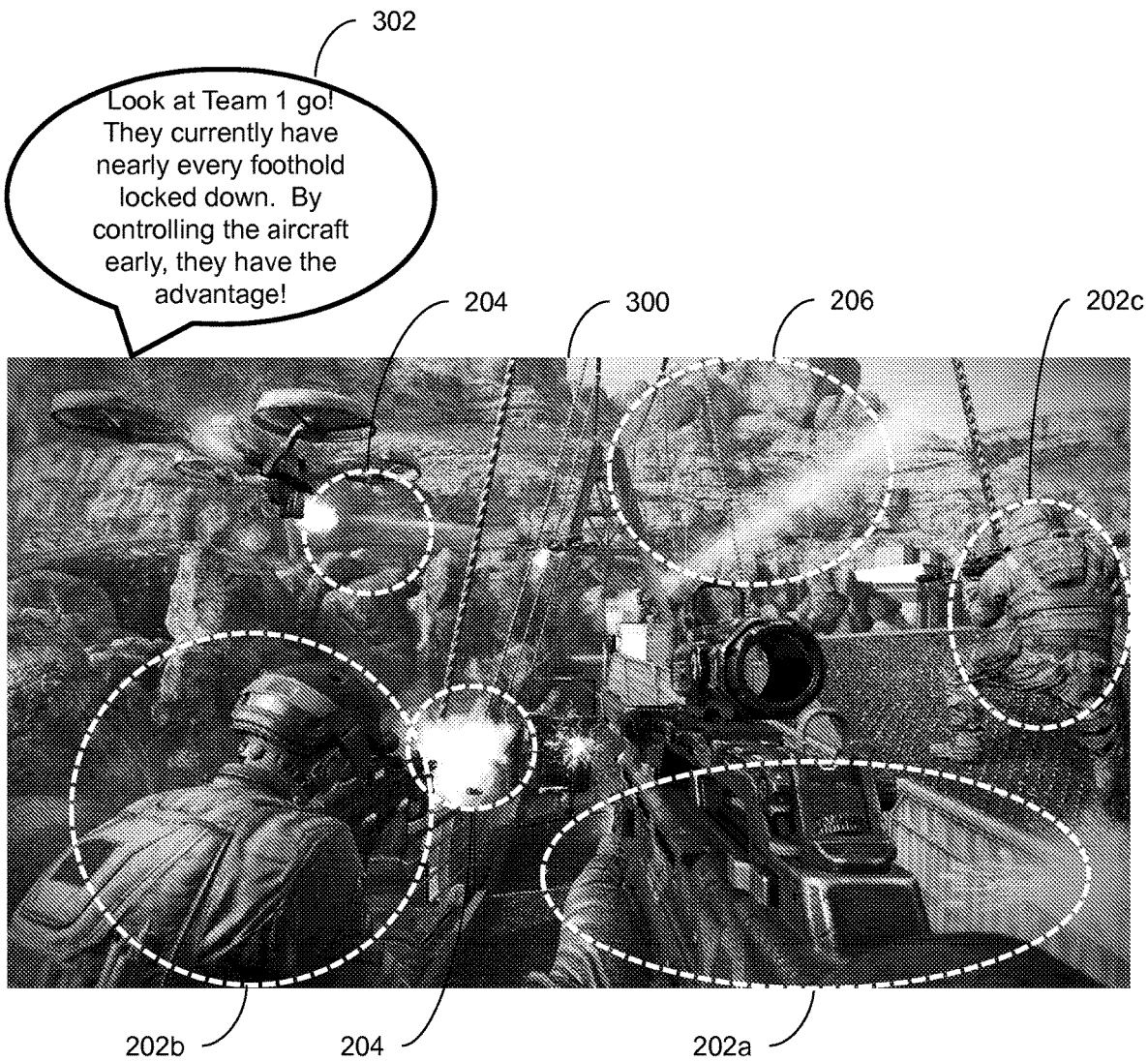
FIGS. 3A and 3B illustrate an augmented game session created during reproduction of a previous game session, in accordance with one or more implementations.
Figure 3B:
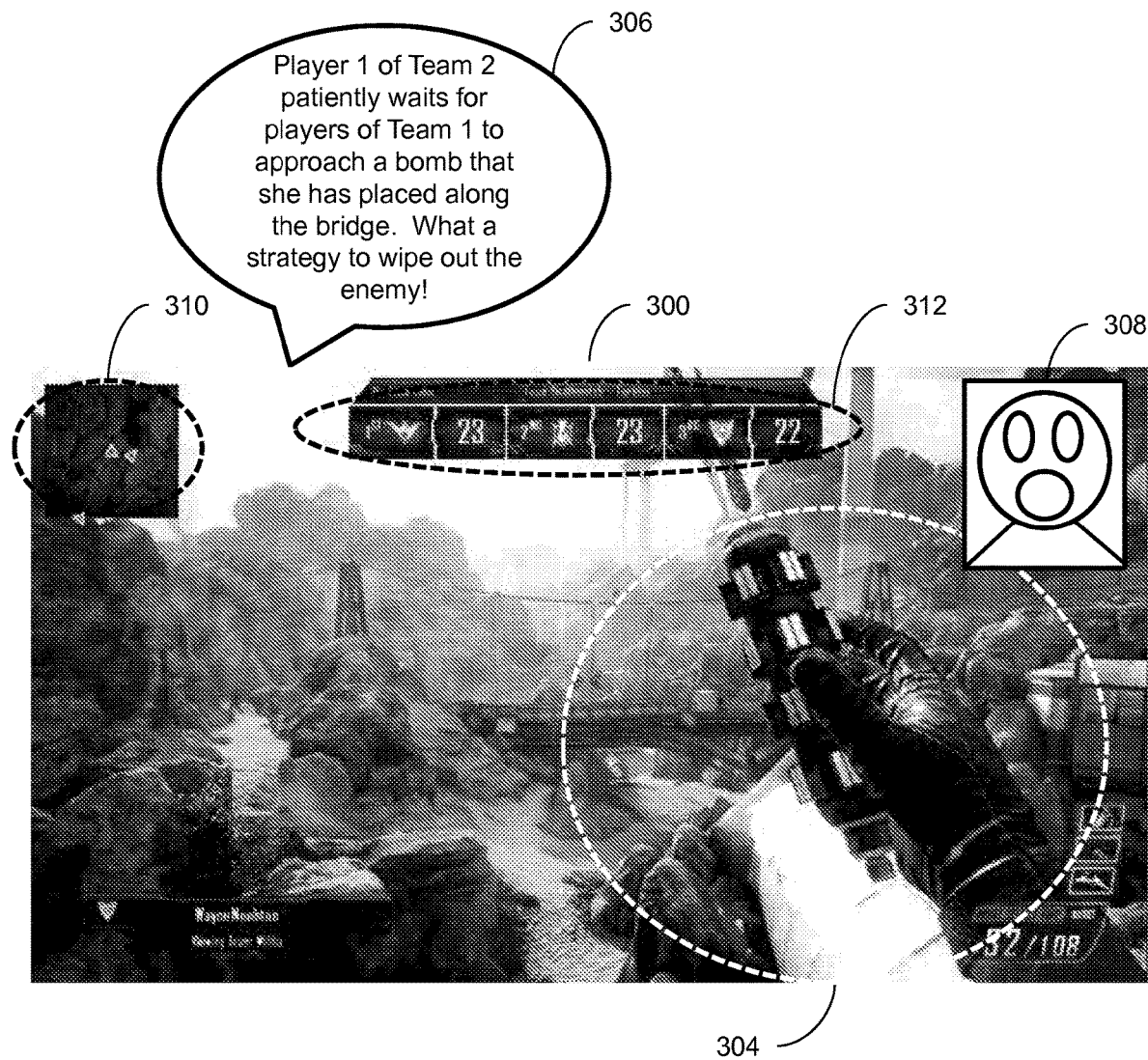

By way of example, FIGS. 3A and 3B illustrate a media stream of an augmented game session 300 created during reproduction of a previous game session, in accordance with one or more implementations. FIGS. 3A and 3B may, for instance, illustrate streamed views of the augmented game session generated based on viewpoints of players on opposing teams (e.g., Teams 1 and 2). In one scenario, with respect to FIG. 3A, a commentating user may facilitate augmentation of the reproduced game session during the reproduction of the previous game session. As shown, the user may have been presented with a first view that is generated based on the viewpoint of player 202a as the user augments content to the reproduced game session to create the augmented game session. The user may, for instance, add audio commentary 302 during the reproduction of the previous game session to point out an important aspect of the previous game play associated with Team 1 such that the media stream of the augmented game session will include the audio commentary. To provide viewers with an uncluttered view, the user may opt to remove screen objects (e.g., compass, maps, alerts, etc.) that may have been presented to player 202a in the previous game session, as indicated in FIG. 3A.

In another scenario, as shown in FIG. 3B, an augmenting user may switch to a viewpoint of a player 304 on Team 2 (e.g., the team opposing Team 1). As such, the user may be presented with a view generated based on the viewpoint of player 304 as the user adds augmentation content to the reproduced game session. For example, when an augmenting user realizes the strategy being implemented by player 304, the user may provide his/her take on that strategy. In some implementations, the user may add audio and/or visual commentary (e.g., audio commentary 306, visual commentary in the form of video window 308, etc.) during the reproduction of the previous game session using a microphone and a camera connected to client computing platform 108 (e.g., a game console). The user may opt to include video window 308 depicting the user in real-time as he/she facilitates augmenting content to the reproduced game session to create the augmented game session. Video window 308 may, for instance, enable viewers of the augmented game session to see the facial expressions of the user as he/she facilitates the augmentation. To add more excitement to the augmented game session, an augmenting user may opt to include a map 310 depicting the current locations of the various players and a leaderboard 312 depicting the current scores of the players (e.g., players 202 and 304), such that a media stream of the augmented game session will include the audio commentary 306, the video window 308, the map 310, and the leaderboard 312.

In certain implementations, game module 110 may be configured to generate a new view of the previous game session during the reproduction of the previous game session. Augmentation module 120 may be configured such that the augmentation content includes the new view. For example, an augmenting user may input a selection for a new viewpoint unavailable to the players in the previous game session, causing generation of a new view based on the new viewpoint selected by the user. Thus, the user may provide commentary for the new view in creating the augmented game session (e.g., such that a media stream of the augmented game session may include the new view and the commentary for the new view).

In a first scenario, a user may opt for an aerial viewpoint that causes the generation of a new view based on the new outlook from the sky. In a second scenario, the user may opt for a viewpoint with x-ray vision that enables the user to see through solid objects (e.g., walls, rocks, etc.) with perfect clarity. The user may, for instance, utilize a two-finger touch gesture on a touch display rendering the current view to "open-up" a vision hole on a solid object that enables the user to see through the solid object via the vision hole. In a third scenario, the user may opt to act as a player (e.g., a reporter that was not in the previous game session, a moving spy robot that was not accessible to the players in the previous game session, etc.) who may move around in the simulated space to have access to viewpoints that the players in the previous game session did not have. In this way, a user is able to provide viewers of the augmented game session with additional insight into the previous game session along with intriguing new views that would otherwise have been missed by simply watching typical recorded media streams having commentary.

In some implementations, augmentation module 120 may be configured to facilitate selection by an augmenting user of one or more views of the augmented game session that are streamed from among a plurality of views of the augmented game session. The plurality of views of the augmented game session may, for instance, include one or more views of the previous game session generated during the reproduction, new views generated during the reproduction, and/or other views associated with the augmented game session. In one use case, augmentation module 120 may facilitate the selection by an augmenting user of one or more views of the augmented game session by working with game module 110 to enable the user to control the one or more properties of the reproduction of the previous game session, such as being able to switch viewpoints (e.g., viewpoints available to the players in the previous game session, viewpoints unavailable to the players in the previous game session, etc.), provide magnifications of the viewpoints, and manage inclusion/omission of screen objects that were accessible to the players in the previous game session for views (e.g., resulting in new views).

In various implementations, augmentation module 120 may be configured such that one of the views of the augmented game session may include multiple views associated with the previous game session. For example, during the reproduction of the previous game session, the user may initially be providing commentary on a first view that is generated based on a viewpoint of a player in the previous game session. However, to make streaming of the augmented game session more interesting, the user may add a second view that is generated based on a viewpoint of an opposing player in the previous game session such that a single view associated with the augmented game session may include both the first and second views depicting viewpoints of opposing players. The first and second views may, for instance, be cropped, resized, and/or reshaped to fit within the single view associated with the augmented game session.

Streaming module 118 may be configured to effectuate streaming of one or more views of the augmented game session. In some implementation, the streaming may include real-time streaming of the one or more views of the augmented game session to one or more viewers as the augmentation content is added to the reproduced game session. By way of example, although the previous game play initially occurred during the previous game session, the game play information associated with the previous game session may be obtained (e.g., downloaded from a web service, loaded from storage at a game console, etc.) and utilized to reproduce the previous game play during a reproduction/augmentation session (e.g., the reproduced and augmented game sessions). Thus, the streaming of the one or more views of the augmented game session may include live, real-time streaming with respect to the augmented game session.

In various implementations, the augmented game session may include a plurality of players. The plurality of players may include a first player and an augmenting user. The game may include a plurality of player types and a plurality of in-game actions. The plurality of player types may include first and second player types. The first player may be of the first player type, and the user may be of the second player type. By way of example, the first player may be a player in the previous game session and the augmented game session, while the user may only be a player in the augmented game session. In one scenario, with respect to the augmented game session, the first player may be a simulated player whose actions may be predefined (e.g., the actions may be recorded from the previous game session in the form of the game play information), while the second player may be a live player whose actions are initiated during the augmented game session to facilitate augmenting content to the reproduced game session.

In another scenario, players of the first player type may be limited to their respective viewpoints. For example, in the previous game session, the players of the first player type may only see what their respective user character sees through a first-person viewpoint and/or the immediate area around their respective user character through a third-person viewpoint. On the other hand, players of the second player type may have access to their own viewpoints as well as the viewpoints of all of the players in the previous game session. For instance, during the reproduction of the previous game session, the user (e.g., being of the second player type) may have the ability to see all interactions taking place among the players in the game world (e.g., aerial viewpoint of the game world, god-like view of the game world, etc.), along with having access to the individual viewpoints of each of the players in the game world (e.g., first-person viewpoint of the players, third-person viewpoint of the players, etc.).

In certain implementations, the plurality of in-game actions may include first actions of the first player type and second actions of the second player type. The first actions of the first player type may be actions that are available to players of the first player type (e.g., the first player), while actions of the second type may be actions that are available to players of the second player type (e.g., the user). In one use case, the second actions may include activating x-ray vision to see through solid objects (e.g., walls, rocks, etc.), transitioning into the bodies of various user characters associated with other players to see what is happening from their viewpoints, instantly accessing viewpoints from any location in the simulated space to obtain "looks" that may have been unavailable to players in the previous game session, and/or other actions of the second player type. Such actions may, for instance, be unavailable to the first player and/or other players of the first player type.

As indicated, in various implementations, the previous game play may include the first actions, and the first actions may have been implemented on behalf of the first player in the previous game session. For example, the first actions may have been implemented during the previous game session responsive to action requests for the first actions by the first player, and recorded during the previous game session in the form of the game play information. The first actions may be reinitiated during the reproduction of the previous game session using the game play information. On the other hand, the second actions may be initiated for the first time during the reproduction of the previous game session. Thus, in some implementations, game module 110 may be configured to implement the second actions for the user during the reproduction of the previous game session responsive to action requests for the second actions by the user.

Game play storage module 122 may be configured to generate the game play information responsive to implementation of the first actions during the previous game session. For example, the game play information may be generated during the previous game session based on actions implemented in the previous game session. The game play information may be stored at a game console, at a web service, etc., to enable future reproduction of the previous game session for augmentation purposes (e.g., creating an augmented game session by adding augmentation content to the reproduced game session during the reproduction of the previous game session). The game play information may, for instance, be generated and stored using one or more languages suitable for recording game play information, such as Extensible Markup Language (XML) and/or other suitable languages.

Figure 4:
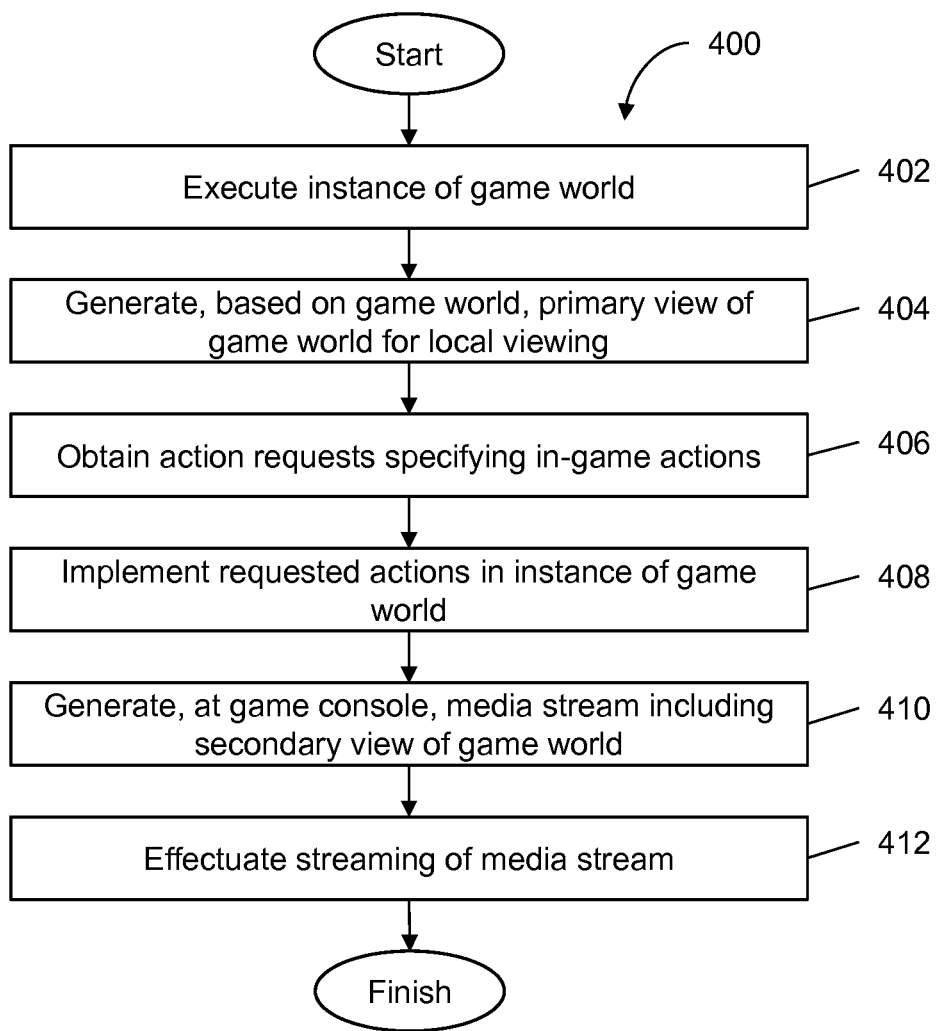
FIG. 4 illustrates a method for facilitating generation of media streams at a game console, in accordance with one or more implementations.

FIG. 4 illustrates a method for facilitating generation of media streams at a game console, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

In an operation 402, an instance of a game world may be executed. For example, the instance of the game world may be executed at a game console. Operation 402 may be performed by a game module that is the same as or similar to game module 110, in accordance with one or more implementations.

In an operation 404, a primary view of the game world may be generated based on the game world for local viewing. For example, the primary view may be the view rendered to a player of the instance of the game world on his/her display locally connected to his/her game consoles. The primary view may be generated based on interactions among various players of the game world, interactions of the players with simulated elements of the game world, simulated events of the game world, augmented elements, and/or other features. The primary view may rendered based on one or more media formats (e.g., image format, video format, etc.) to depict the various interactions, simulated events, augmented elements, and/or other features. Operation 404 may be performed by a game module that is the same as or similar to game module 110, in accordance with one or more implementations.

In an operation 406, action requests specifying in-game actions may be obtained. Both players and augmenting users (e.g., who may also be players) may, for instance, input the action requests via their respective game consoles to interact with one another, to travel around the game world having one or more simulated elements, to complete objectives in the game world, and/or to perform other activities associated with the game world. Operation 406 may be performed by a communication module that is the same as or similar to communication module 112, in accordance with one or more implementations.

In an operation 408, the requested actions may be implemented in the instance of the game world. For example, when implemented, the requested actions may cause one or more simulated events in the instance of the game world, resulting in the generation of the primary view depicting the simulated events. Operation 408 may be performed by a game module that is the same as or similar to game module 110, in accordance with one or more implementations.

In an operation 410, a media stream including a secondary view of the game world may be generated at the game console. The secondary view of the game world may be a lower-quality version of the primary view. By way of example, the generation of the secondary view may include: a prefetching, to the cache (e.g., L1 cache, L2 cache, etc.) of the game console, one or more of portions of the primary view or instructions for encoding the portions of the primary view; an encoding, based on the prefetching, of the portions of the primary view to produce the secondary view. For example, the portions of the primary view may be encoded using prefetched-cached portions of the primary view and prefetched-cached encoding instructions to produce the secondary view. Operation 410 may be performed by an encoding module that is the same as or similar to encoding module 114, in accordance with one or more implementations.

It should be noted that, in some implementations, the encoding module (which is the same as or similar to encoding module 114) may be configured to include code that indicates the prefetching to the cache and the encoding of the portions of the primary view to produce the secondary view. In other implementations, processors 104 may include a first processor of a first type and a second processor of a second type. The code may indicate execution of a first part of the code using the first processor and execution of a second part of the code using the second processor.

In certain implementations, operation 410 may be performed by a vector processing module that is the same as or similar to vector processing module 116 such that the vector processing module may initiate the prefetching to the cache and the encoding of the portions of the primary view to produce the secondary view. In some implementations, the vector processing module may be configured to load, in parallel: (1) one or more of a first portion of the portions or the instructions for encoding the first portion; and (2) one or more of a second portion of the portions or the instructions for encoding the second portion, from the cache to a register associated with the vector processing module such that the encoding of the portions of the primary view to produce the secondary view is based on the loading from the cache to the register.

In an operation 412, streaming of the media stream may be effectuated. The media stream may, for instance, be streamed from the game console to one or more viewers via a web service. Operation 412 may be performed by a streaming module that is the same as or similar to streaming module 118, in accordance with one or more implementations.

Figure 5:
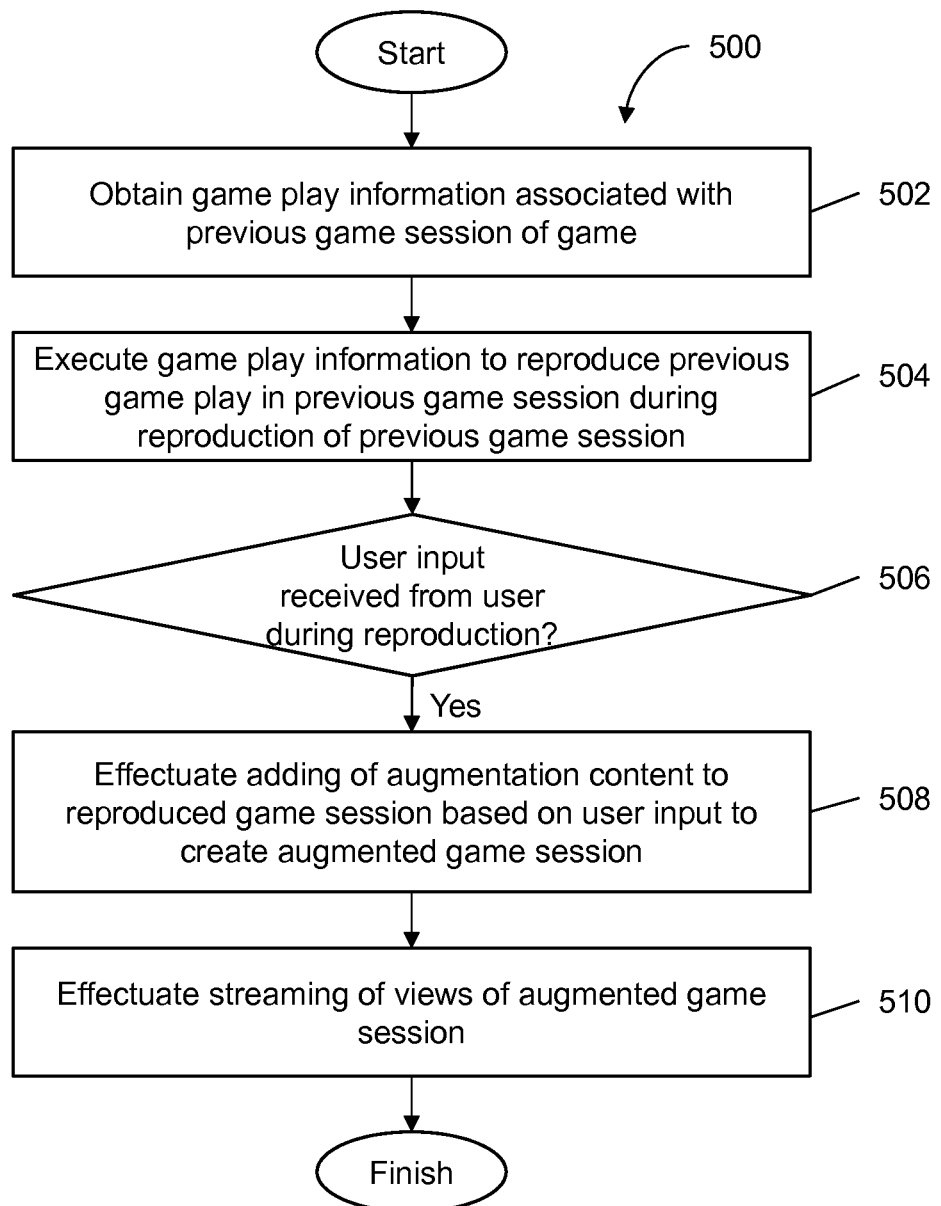
FIG. 5 illustrates a method for facilitating streaming of augmented game sessions created via augmentation during reproduction of previous game sessions, in accordance with one or more implementations.

FIG. 5 illustrates a method for facilitating streaming of augmented game sessions created via augmentation during reproduction of previous game sessions, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

In an operation 502, game play information associated with a previous game session of a game may be obtained. The game play information may define previous game play of the previous game session. As indicated, the previous game play may include actions initiated by players of the previous game session, interactions among user characters associated with the players, attributes of the user characters, environments of the previous game session (e.g., in which the actions were initiated, the user characters interacted with, etc.), and/or other game play. Operation 502 may be performed by a game module that is the same as or similar to game module 110, in accordance with one or more implementations.

In an operation 504, the game play information may be executed to reproduce the previous game play in the previous game session during a reproduction of the previous game session. For example, the previous game play may be reproduced by reinitiating the actions defined in the game play information in their respective sequence order within the context of the environment in which the actions took place. Operation 504 may be performed by a game module that is the same as or similar to game module 110, in accordance with one or more implementations.

In an operation 506, a determination of whether user input is received from an augmenting user during the reproduction of the previous game session may be effectuated. The user input may, for instance, relate to adding of augmentation content to the reproduced game session, such as inputting audio/visual commentary, adding one or more screen objects (e.g., maps, leaderboards, clocks/timers, etc.), adding new views that may not have been available for presentation to the players in the previous game session, and/or other user inputs. Operation 506 may be performed by a communication module that is the same as or similar to communication module 112, in accordance with one or more implementations. Responsive to a determination that user input is received from the user during the reproduction of the previous game session, method 500 may proceed to an operation 508.

In operation 508, augmentation content may be added to the reproduced game session based on the user input to create augmented game session. In some implementations, selection by the user of one or more views of the augmented game session that are to be streamed may be facilitated. The selection by the user may be from among a plurality of views of the augmented game session. The plurality of views of the augmented game session may, for instance, include generated views of the previous game session, new views generated during the reproduction of the previous game session, and/or other views associated with the augmented game session. Operation 508 may be performed by an augmentation module that is the same as or similar to augmentation module 120, in accordance with one or more implementations.

In an operation 510, streaming of the one or more views of the augmented game session (e.g., the views selected by the user) may be effectuated. For example, if the reproduction of the game session is performed on a game console, the streaming of the one or more views of the augmented games session may be from the game console to a web server (e.g., for distribution to one or more viewers from the web server). In some implementations, the streaming may include real-time streaming of the one or more views of the augmented game session to one or more viewers as the augmented content is added to the reproduced game session. Operation 510 may be performed by a streaming module that is the same as or similar to streaming module 118, in accordance with one or more implementations.

Figure 6:
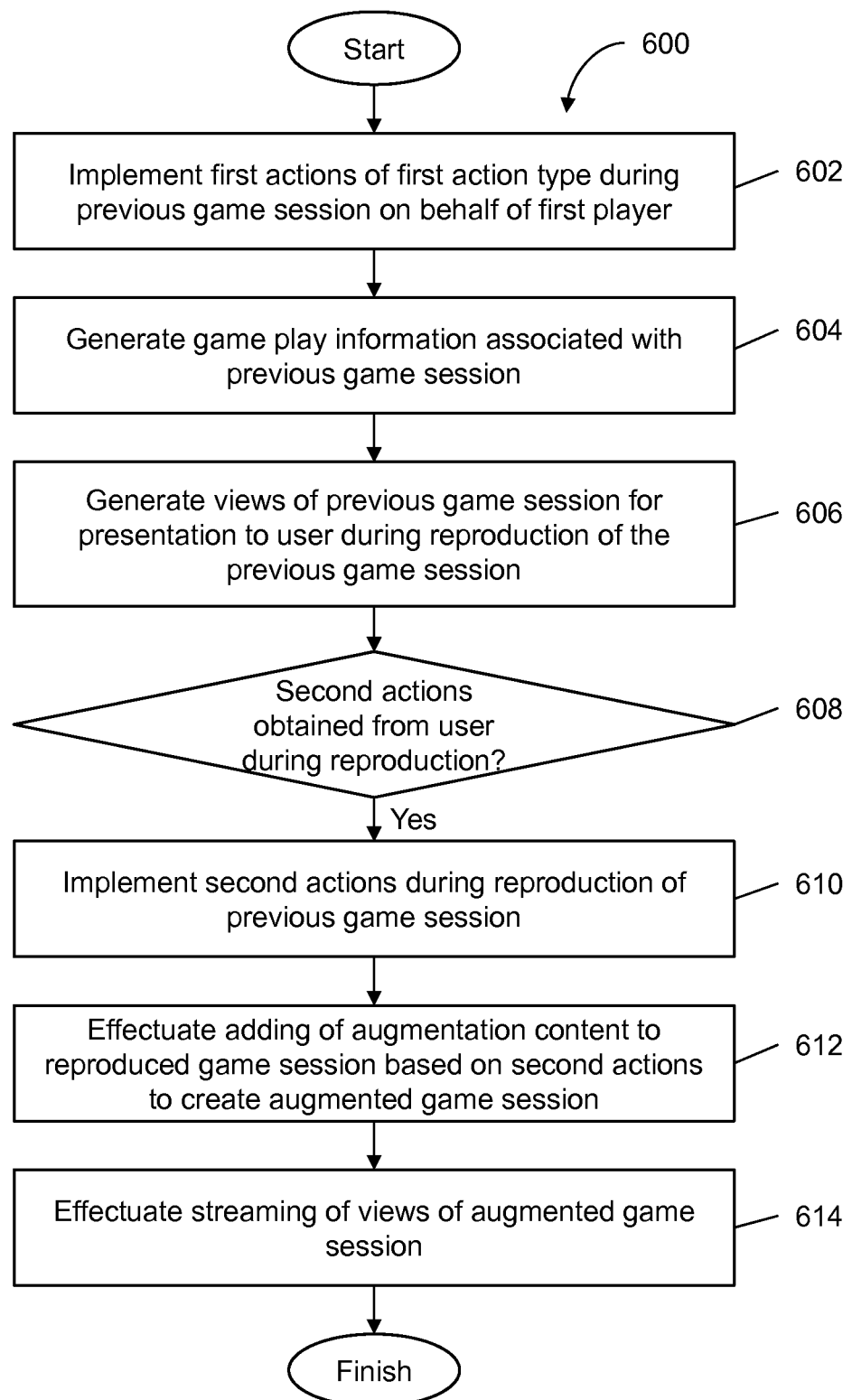
FIG. 6 illustrates a method for facilitating streaming of augmented game sessions created via augmentation based on player actions during reproduction of previous game sessions, in accordance with one or more implementations.

FIG. 6 illustrates a method for facilitating streaming of augmented game sessions created via augmentation based on player actions during reproduction of previous game sessions, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

By way of example, the augmented game session may include a plurality of players. The plurality of players may include a first player and an augmenting user. The first player may, for instance, be a player in the previous game session and the augmented game session, while the user may only be a player in the augmented game session. The first player may be of a first player type, and the user may be of a second player type. In one scenario, with respect to the augmented game session, the first player may be a simulated player whose actions may be predefined (e.g., the actions may be recorded from the previous game session in the form of the game play information), while the second player may be a live player whose actions are initiated during the augmented game session to facilitate augmenting content to the reproduced game session.

In an operation 602, first actions of the first player type may be implemented during the previous game session on behalf of the first player. For example, the first actions may have been implemented during the previous game session responsive to action requests for the first actions by the first player. The first actions of the first player type may be actions that are available to players of the first player type (e.g., viewpoint-related actions of such players may be limited to their respective first-person and/or third-person viewpoints). Operation 602 may be performed by a game module that is the same as or similar to game module 110, in accordance with one or more implementations.

In an operation 604, game play information associated with the previous game session may be generated. For example, the game play information may be generated during the previous game session based on actions implemented in the previous game session (e.g., the first actions of the first player type). The game play information may be stored at a game console, at a web service, etc., to enable future reproduction of the previous game session for augmentation purposes. Operation 604 may be performed by a game play storage module that is the same as or similar to game play storage module 122, in accordance with one or more implementations.

In an operation 606, one or more views of the previous game session may be generated for presentation to the user during the reproduction of the previous game session (e.g., using the game play information). For example, the views of the previous game session may be based on the respective viewpoints of the players in the previous game session along with the respective first actions of the players that were implemented in the previous game session (e.g., changing of the viewpoints, engaging in combat, moving around in the game world, etc.). The views of the previous game session may be generated during the reproduction of the previous game session to enable the user to select and switch to any of the views of the previous game session that the user wishes to include in a live media stream (e.g., real-time streaming with respect to the augmented game session), while the user adds his/her own audio and/or visual commentary to the selected views during the reproduction of the previous game session. The augmentation of the audio/visual commentary and the selected views may, for instance, result in generating of one or more views of the augmented game session. Operation 606 may be performed by a game module that is the same as or similar to game module 110, in accordance with one or more implementations.

In an operation 608, a determination of whether second actions of a second player type is obtained from the user during the reproduction of the previous game session. The second actions of the second player type may be actions that are available to players of the second player type (e.g., viewpoint-related actions of such players may be more expansive than viewpoint-related actions of players of the first player type). Operation 608 may be performed by a game module that is the same as or similar to game module 110, in accordance with one or more implementations. Responsive to a determination that second actions is obtained from the user during the reproduction of the previous game session, method 600 may proceed to an operation 610.

In operation 610, the second actions may be implemented during the reproduction of the previous game session. For example, the user may request actions to switch among viewpoints of the various players of the previous game session (e.g., selecting generated views of the previous game session). As such, the user may be presented with the viewpoints of the various players indicated by the requested actions. Operation 610 may be performed by a game module that is the same as or similar to game module 110, in accordance with one or more implementations.

In an operation 612, the augmentation content may be added to the reproduced game session based on the second actions to create the augmented game session. The augmentation content may include new views of the previous game session (e.g., views generated based on viewpoints not available to players in the previous game session during the reproduction based on their predefined actions), audio/visual commentary, screen objects, and/or other content. Operation 612 may be performed by an augmentation module that is the same as or similar to augmentation module 120, in accordance with one or more implementations.

In an operation 614, streaming of one or more views of the augmented game session may be effectuated. As indicated, in some scenarios, if the reproduction of the game session is performed on a game console, the streaming of the one or more views of the augmented games session may be from the game console to a web server (e.g., for distribution to one or more viewers from the web server). In some implementations, the streaming may include real-time streaming of the one or more views of the augmented game session to one or more viewers as the augmented content is added to the reproduced game session. Operation 614 may be performed by a streaming module that is the same as or similar to streaming module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating streaming of media streams from a game console to a plurality of computing devices, the system comprising:

non-transient electronic storage media that store a cache, the game console including the non-transient electronic storage media; and one or more processors configured to execute computer program modules, the computer program modules comprising:

a game module configured to execute an instance of a game world, the game module being configured to generate, based on the game world, a primary view of the game world for local viewing;

a communication module configured to obtain action requests specifying in-game actions, wherein the game module is configured to implement requested actions in the instance of the game world;

an encoding module configured to generate, at the game console, a media stream including a secondary view of the game world, wherein the secondary view is a lower-quality version of the primary view, the encoding module being configured such that the generation of the media stream includes: prefetching, to the cache, one or more of portions of the primary view or instructions for encoding the portions of the primary view; and encoding, based on the prefetching, the portions of the primary view to produce the secondary view; and a streaming module configured to effectuate streaming of the media stream having the secondary view to the plurality of computing devices such that individuals using the plurality of computing devices can access and view the secondary view.

2. The system of claim 1, wherein the encoding module includes code that indicates the prefetching to the cache and the encoding to produce the secondary view.

3. The system of claim 2, wherein the one or more processors include a first processor of a first processor type and a second processor of a second processor type different from the first processor type, and wherein the code indicates execution of a first part of the code using the first processor and execution of a second part of the code using the second processor.

4. The system of claim 1, wherein the computer program modules comprises a vector processing module, the vector processing module including the encoding module such that the vector processing module is configured to initiate the prefetching to the cache and the encoding to produce the secondary view.

5. The system of claim 4, wherein the vector processing module is configured to load, in parallel, one or more of a first portion of the portions or the instructions for encoding the first portion from the cache to a first register associated with the vector processing module, and one or more of a second portion of the portions or the instructions for encoding the second portion from the cache to a second register associated with the vector processing module, such that the encoding to produce the secondary view is based on the loading from the cache to the first and second registers.

6. The system of claim 1, wherein the portions of the primary view are represented by a first set of numbers of a first number type, and the computer program modules comprise a number-type conversion module configured to convert the first set of numbers into a second set of numbers of a second number type, and wherein the encoding to produce the secondary view is based on the conversion.

7. The system of claim 1, wherein the secondary view has a first resolution and the primary view has a second resolution and wherein the first resolution is less than the second resolution.

8. The system of claim 1, wherein the secondary view has a first frame rate and the primary view has a second frame rate and wherein the first frame rate is less than the second frame rate.

9. The system of claim 1, wherein the secondary view has a first bit rate and the primary view has a second bit rate and wherein the first bit rate is less than the second bit rate.

10. A method for facilitating streaming of media streams from a game console to a plurality of computing devices, the method being implemented in a computer system that includes one or more processors executing computer program modules, the method comprising:

executing an instance of a game world;

generating, based on the game world, a primary view of the game world for local viewing;

obtaining action requests specifying in-game actions;

implementing requested actions in the instance of the game world;

generating, at the game console having non-transient electronic storage media that store a cache, a media stream including a secondary view of the game world, wherein the secondary view is of a lower-quality version of the primary view, and wherein the generation of the media stream includes: prefetching, to the cache, one or more of portions of the primary view or instructions for encoding the portions of the primary view; and encoding, based on the prefetching, the portions of the primary view to produce the secondary view; and effectuating streaming of the media stream having the secondary view to the plurality of computing devices such that individuals using the plurality of computing devices can access and view the secondary view.

11. The method of claim 10, wherein an encoding module of the computer program modules include code that indicates the prefetching to the cache and the encoding to produce the secondary view.

12. The method of claim 11, wherein the one or more processors include a first processor of a first processor type and a second processor of a second processor type different from the first processor type, and wherein the code indicates execution of a first part of the code using the first processor and execution of a second part of the code using the second processor.

13. The method of claim 10, wherein a vector processing module of the computer program modules is configured to initiate the prefetching to the cache and the encoding to produce the secondary view.

14. The method of claim 13, further comprising loading, in parallel by the vector processing module, one or more of a first portion of the portions or the instructions for encoding the first portion, and one or more of a second portion of the portions or the instructions for encoding the second portion, from the cache to a register associated with the vector processing module such that the encoding to produce the secondary view is based on the loading from the cache to the register.

15. The method of claim 10, wherein the portions of the primary view are represented by a first set of numbers of a first number type, the method further comprising converting the first set of numbers into a second set of numbers of a second number type, wherein the encoding to produce the secondary view is based on the conversion.

16. The method of claim 10, wherein the secondary view has a first resolution and the primary view has a second resolution and wherein the first resolution is less than the second resolution.

17. The method of claim 10, wherein the secondary view has a first frame rate and the primary view has a second frame rate and wherein the first frame rate is less than the second frame rate.

18. The method of claim 10, wherein the secondary view has a first bit rate and the primary view has a second bit rate and wherein the first bit rate is less than the second bit rate.

* * * * *